United States Patent [19]
Grainger

[11] 3,990,421
[45] Nov. 9, 1976

[54] ANTI-POLLUTION STRUCTURE WITH A FUEL ECONOMIZING FUEL FEED AND EXHAUST SYSTEM FOR AN INTERNAL COMBUSTION ENGINE

[76] Inventor: Lewis M. D. Grainger, 1800 LeSuer Road, Richmond, Va. 23229

[22] Filed: Nov. 7, 1974

[21] Appl. No.: 521,884

[52] U.S. Cl. .................... 123/122 D; 123/119 B; 123/119 D; 123/124 A; 123/119 R
[51] Int. Cl.² .................................. F02M 31/08
[58] Field of Search .................. 123/122 D, 119 D, 123/119 DB, 122 C, 119 B, 119 C, 124 R, 124 A

[56] References Cited
UNITED STATES PATENTS

| | | | |
|---|---|---|---|
| 2,152,028 | 3/1939 | Church | 123/119 DB |
| 2,756,730 | 7/1956 | Patchan | 123/122 D X |
| 3,166,061 | 1/1965 | Weiser | 123/119 D |
| 3,186,394 | 6/1965 | Ramun | 123/122 D |
| 3,473,522 | 10/1969 | Bailey | 123/122 D |
| 3,563,007 | 2/1971 | Clarke | 123/122 D X |
| 3,581,722 | 6/1971 | McKellar | 123/122 D |
| 3,656,462 | 4/1972 | Bailey | 123/122 D |
| 3,728,856 | 4/1973 | Scherenberg | 123/122 D X |
| 3,732,696 | 5/1973 | Masaki | 123/122 D X |
| 3,809,019 | 5/1974 | Stoltman | 123/122 D X |

*Primary Examiner*—Charles J. Myhre
*Assistant Examiner*—Ira S. Lazarus
*Attorney, Agent, or Firm*—Blair & Brown

[57] ABSTRACT

In the anti-pollution structure with a fuel economizing fuel feed and exhaust system for an internal combustion engine of the present invention an air blower is positively driven from the fan pulley and provides a supply of air to an exhaust heated heat exchanger with a portion of the air flowing into a plurality of exhaust burners and a portion of the air being fed to the air cleaner of the carburetor. Another portion of the air is fed into an air injector between the carburetor and the intake manifold to provide an extra supply of air at a relatively high velocity. The invention is illustrated as applied to both a V-8 engine and a 4 cylinder engine.

1 Claim, 13 Drawing Figures

FIG. 2.
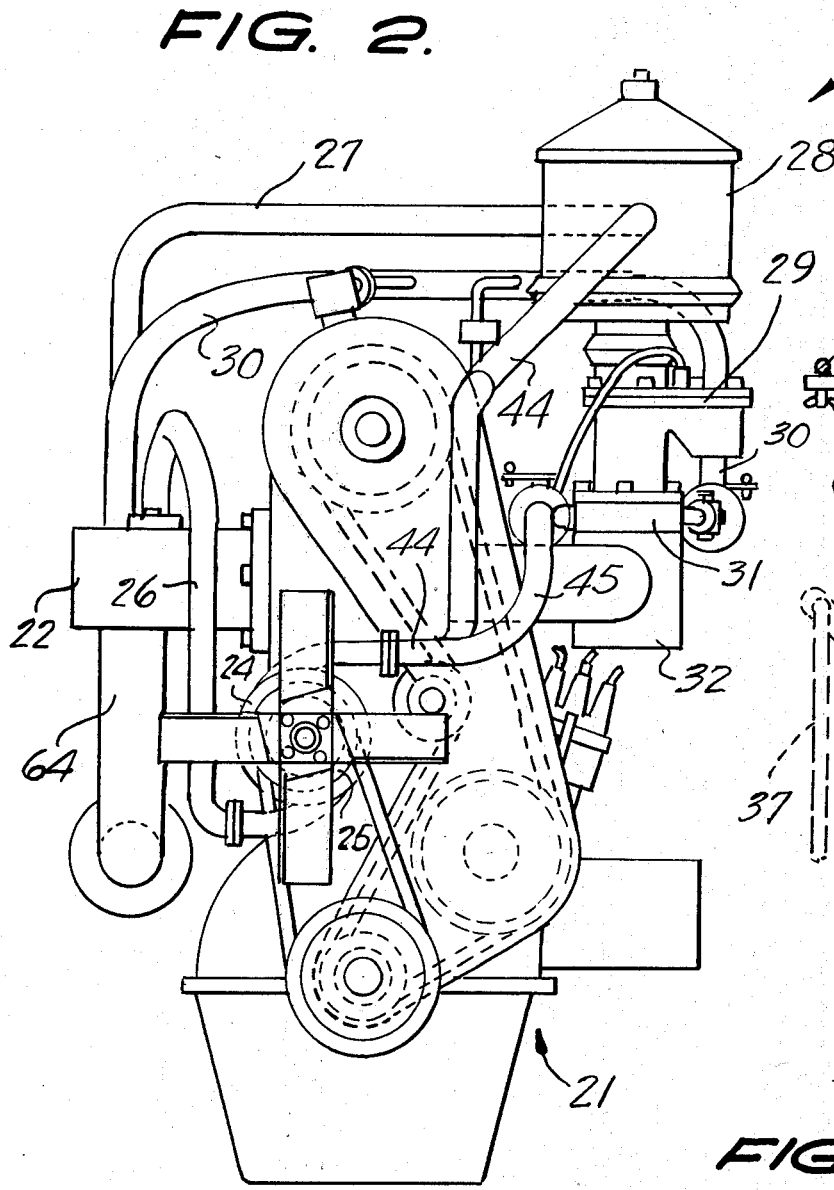
FIG. 5.
FIG. 6.
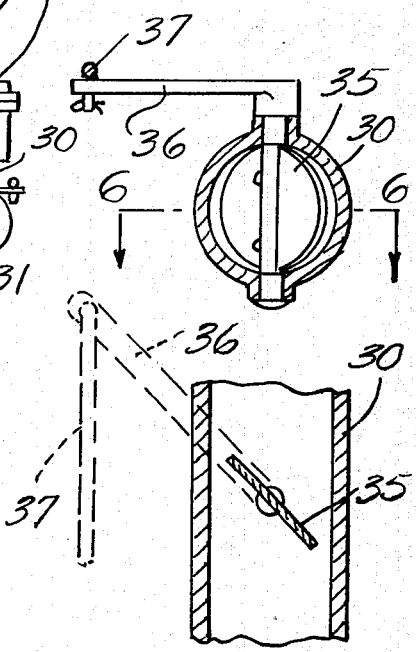
FIG. 7.
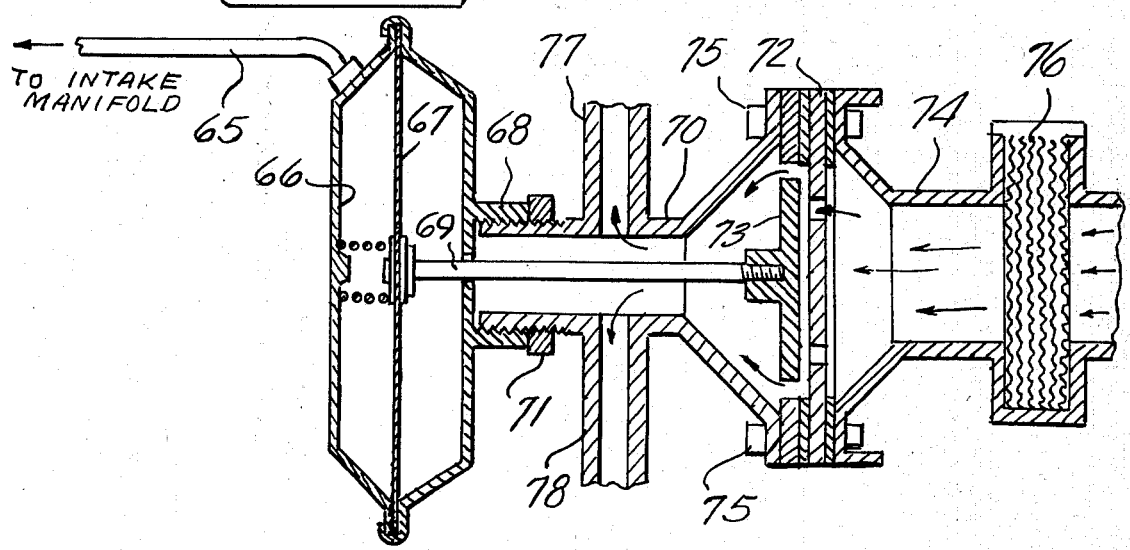

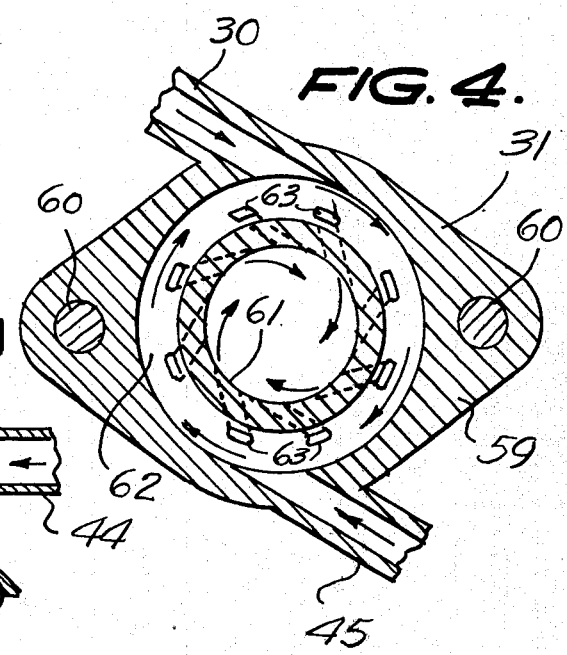
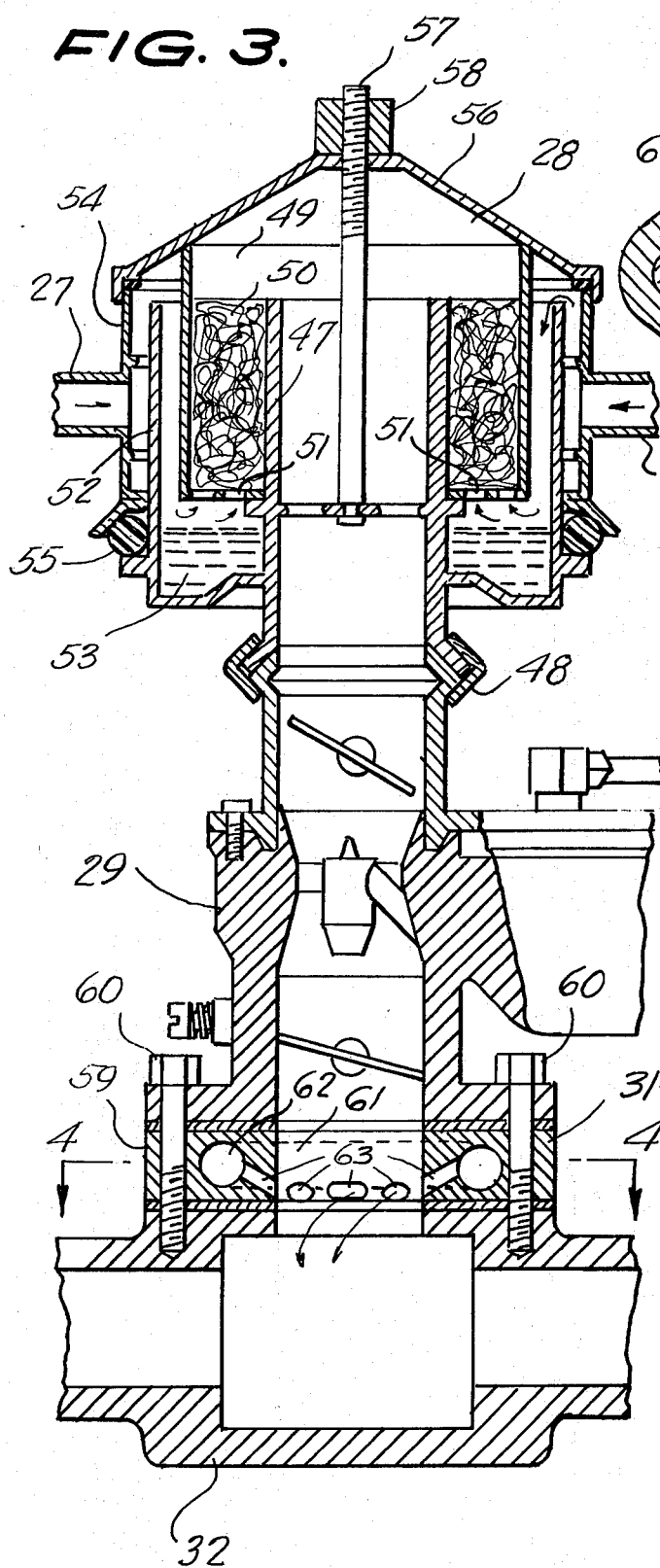

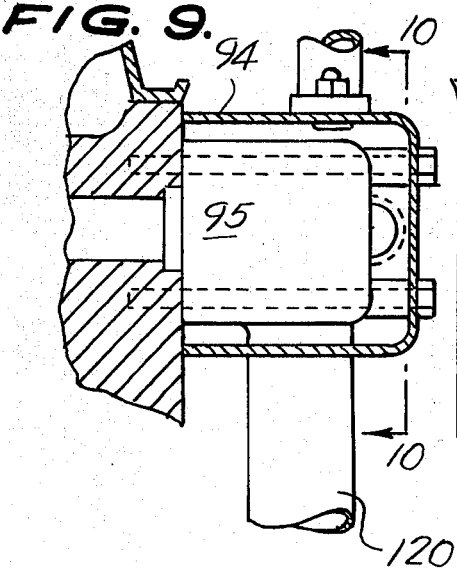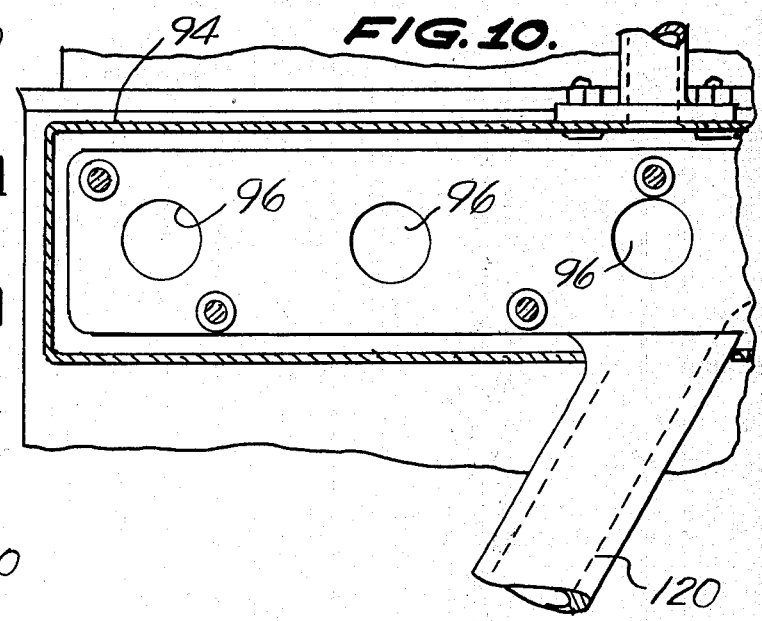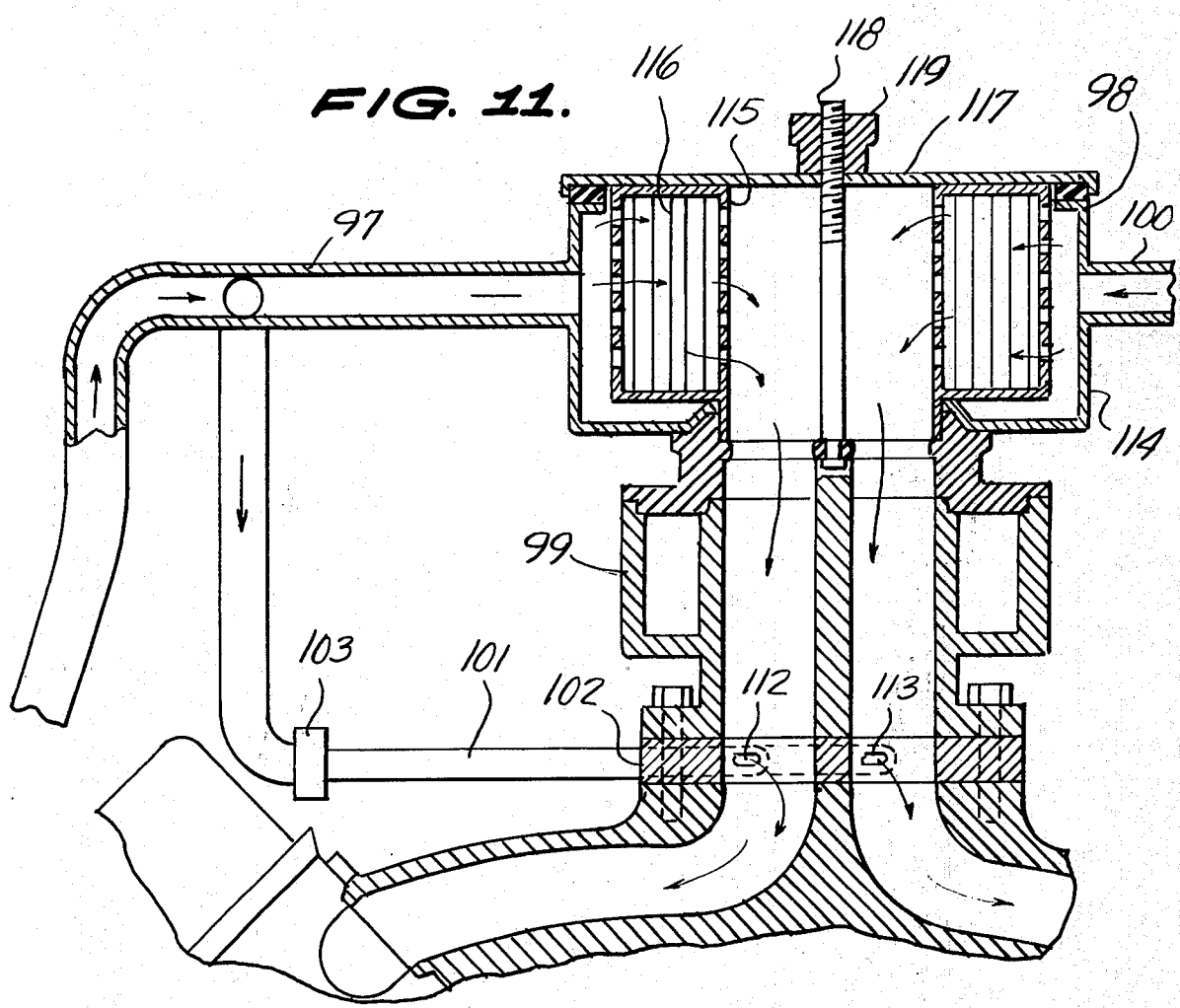

ANTI-POLLUTION STRUCTURE WITH A FUEL ECONOMIZING FUEL FEED AND EXHAUST SYSTEM FOR AN INTERNAL COMBUSTION ENGINE

BACKGROUND OF THE INVENTION

Field of the Invention

The present invention relates to an anti-pollution structure with a fuel economizing fuel feed and exhaust system for an internal combustion engine.

SUMMARY OF THE INVENTION

Air from a fan pulley driven air blower is fed to a heat exchanger where a portion of the air is fed to an exhaust burner system and another portion of the air is fed to the air cleaner of the engine carburetor. A third portion of the air is fed to an air injector between the carburetor and the intake manifold so that heated air is supplied to both the air cleaner and to the intake manifold. Venting connections for the engine entrain pollutants in conduits extending to the air injector.

The primary object of the invention is to provide an anti-pollution structure with a fuel economizing fuel feed and exhaust system for an internal combustion engine.

Other objects and advantages will become apparent in the following specification when considered in light of the attached drawings.

BRIEF DESCRIPTION OF THE DRAWINGS

FIG. 2 is a front elevation of the engine of FIG. 1;

FIG. 3 is an enlarged fragmentary vertical sectional view, taken along the line 3—3 of FIG. 1 looking in the direction of the arrows;

FIG. 4 is a fragmentary horizontal sectional view, taken along the line 4—4 of FIG. 3, looking in the direction of the arrows;

FIG. 5 is an enlarged fragmentary vertical sectional view, taken along the line 5—5 of FIG. 1, looking in the direction of the arrows;

FIG. 6 is a fragmentary horizontal sectional view, taken along the line 6—6 of FIG. 5, looking in the direction of the arrows;

FIG. 7 is a sectional view through a modified valve system used with the invention;

FIG. 9 is an enlarged fragmentary vertical sectional view, taken along the line 9—9 of FIG. 8, looking in the direction of the arrows;

FIG. 10 is a fragmentary vertical sectional view, taken along the line 10—10 of FIG. 9, looking in the direction of the arrows;

FIG. 11 is an enlarged fragmentary vertical sectional view, taken along the line 11—11 of FIG. 8, looking in the direction of the arrows;

DESCRIPTION OF THE PREFERRED EMBODIMENTS

Figure 1:
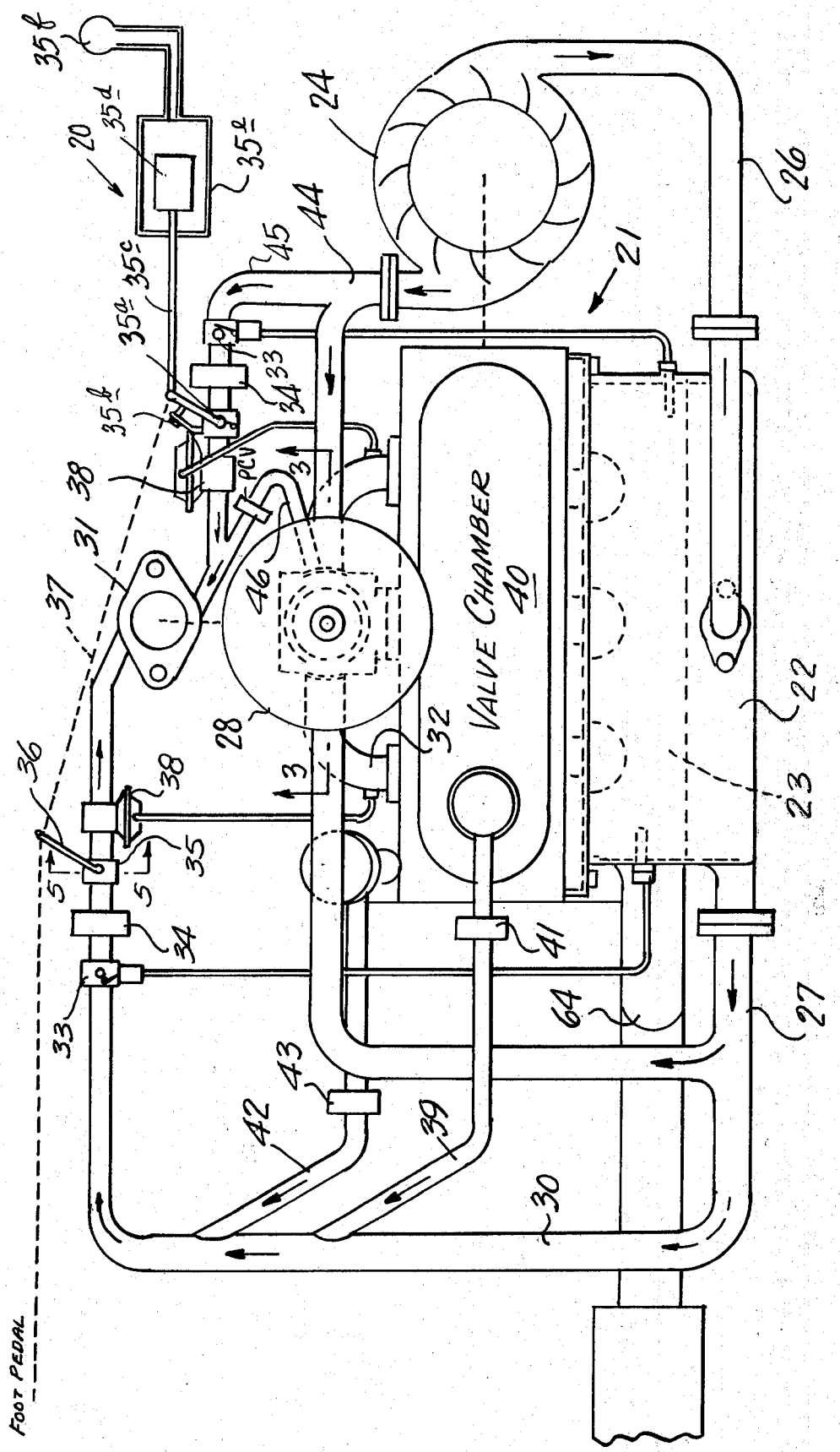
FIG. 1 is a top plan view of an engine incorporating the invention.
Figure 8:
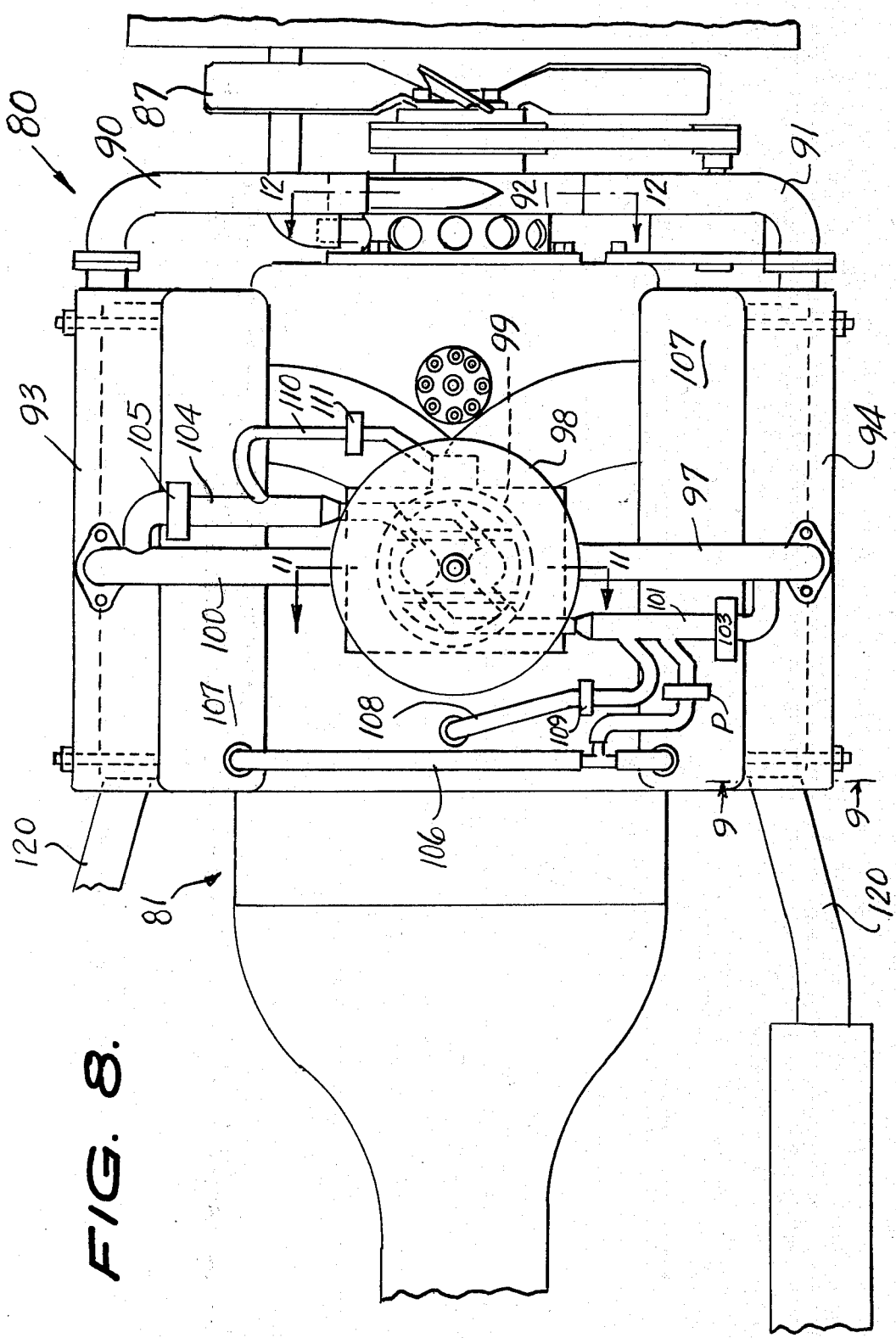
FIG. 8 is a top plan view of another engine incorporating the invention.
Figure 12:
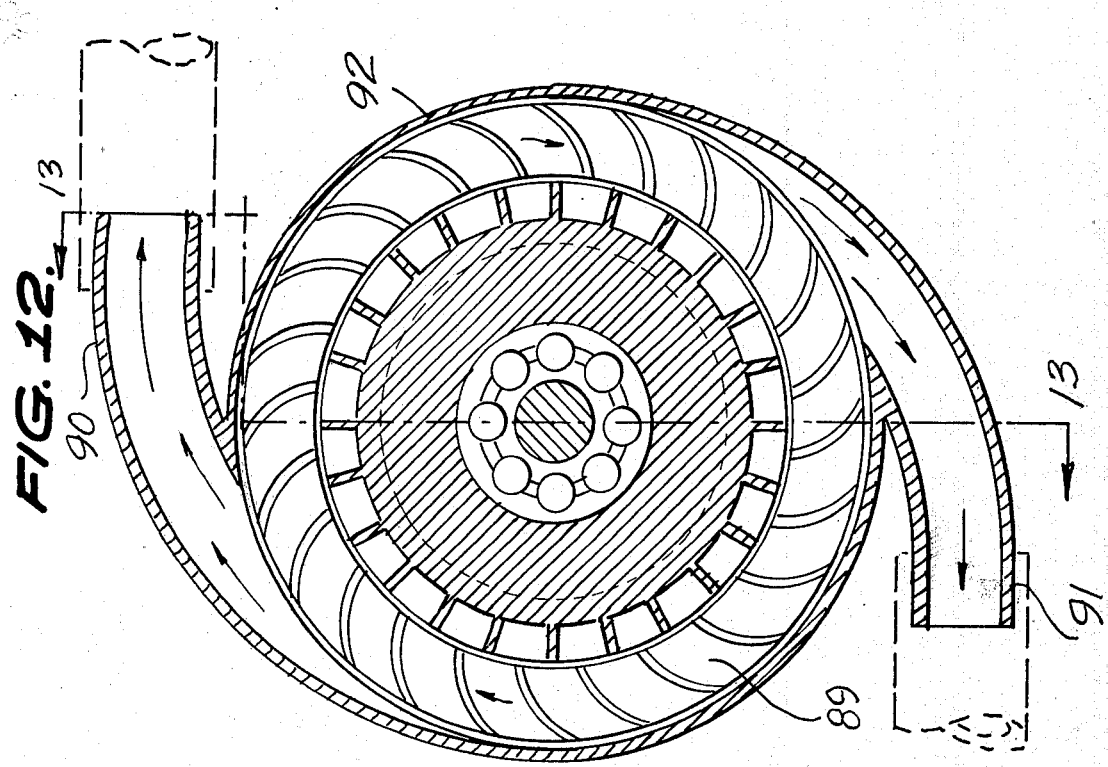
FIG. 12 is an enlarged fragmentary vertical sectional view, taken along the line 12—12 of FIG. 8 and of FIG. 13.
Figure 13:
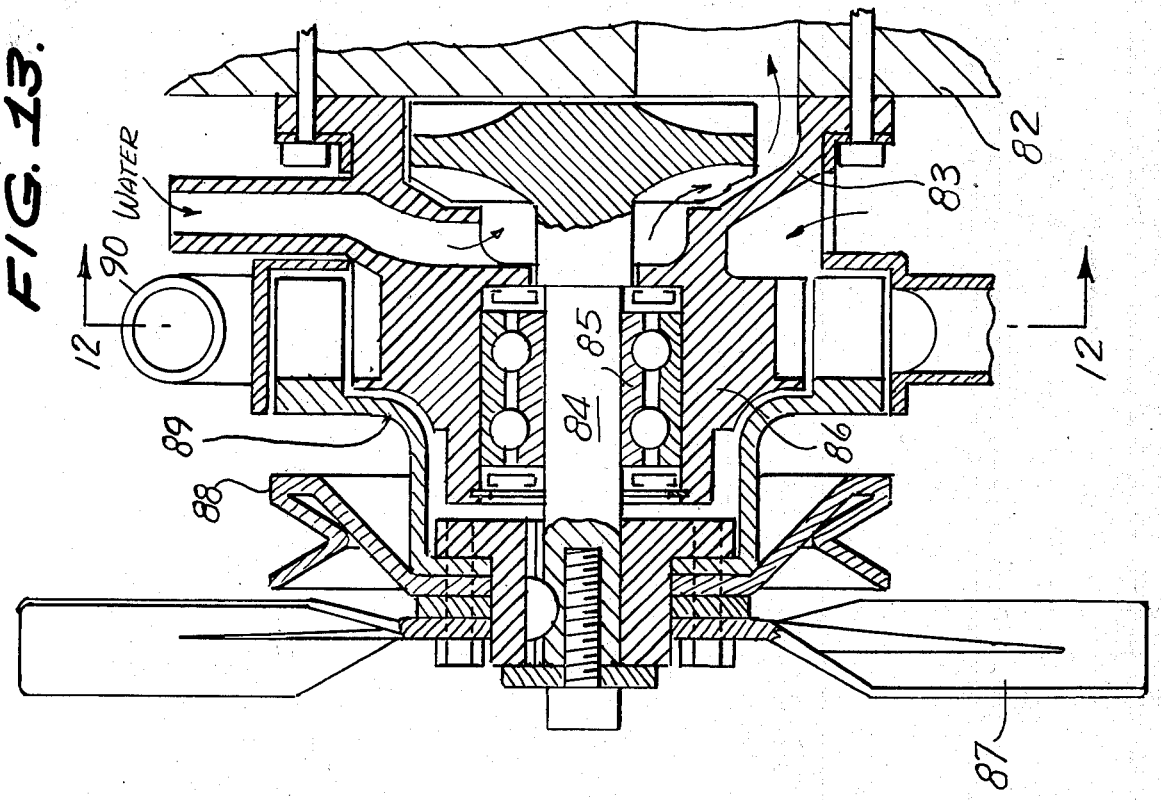
FIG. 13 is a vertical sectional view, taken along the line 13—13 of FIG. 12, looking in the direction of the arrows.

Referring now to the drawings in detail, wherein like reference characters indicate like parts throughout the several figures, the reference numeral 20 indicates generally an anti-pollution structure with a fuel economizing fuel feed and exhaust system for an internal combustion engine shown generally at 21.

The engine 21 is of conventional internal design and includes a combined integral heat exchanger and exhaust manifold 22 having an exhaust burner 23 of the type illustrated in detail in my Patent Number 3,630,031 entitled Anti-Pollution System for Internal Combustion Engines.

A blower 24 is mounted on the front of the engine 21 and is driven by fan pulley 25 so as to provide a flow of air under pressure when the engine 21 is operational. An air conduit 26 extends from the blower 24 to the heat exchanger 22 providing a supply of air thereto which is heated therein by exhaust gas flow. The air supplied to the heat exchanger 22 provides the supply of air for the exhaust burners 23 and additionally provides the supply of heated air which flows from the heat exchanger 22 through a conduit 27. The conduit 27 extends to the air cleaner 28 of a carburetor 29 as can be seen in FIGS. 1 and 2. A branch conduit 30 extends from the conduit 27 to a venting air injector 31 positioned between the carburetor 29 and the intake manifold 32. A thermostat control valve 33 is mounted in the line 30 to provide heat control for the air flowing from the heat exchanger 22. A filter 34 in the line 30 prevents dirt from reaching the venting air injector 31. A first throttle valve 35 is mounted in the conduit 30 and has an arm 36 connected to the throttle linkage 37. A vacuum control valve 38 is also positioned in the conduit 30 to regulate the flow of air through the conduit 30 by the vacuum in the intake manifold 32. A conduit 39 extends from the valve chamber 40 through a PCV valve 41 to the conduit 30 to vent the valve chamber 40 and eliminate oil and gas fumes therefrom.

A conduit 42 extends from the crank case of the engine 21 through a PCV valve 43 and is connected to the conduit 30 to vent the crank case and eliminate oil fumes therefrom.

A conduit 44 extends from the blower 24 to the air cleaner 28 and a branch conduit 45 extends from the conduit 44 to the venting air injector 31. A thermostat valve 33 is positioned in the conduit 45 and a filter 34 filters the air flowing therethrough. A throttle valve 35a is positioned in the conduit 45 and has an idle adjustment screw 35b mounted thereon to maintain an idle adjustment of air flowing through the conduit 45. Linkage 35c is connected to the throttle valve 35a and extends to a piston 35d mounted in a hollow cylinder 35e. The hollow cylinder 35e controls the carburetor throttle valve 35f when the piston 35d has moved to contact the end of hollow cylinder 35e. A vacuum actuated valve 38 is also positioned in the conduit 45 to regulate the flow of air therethrough by the vacuum of the intake manifold 32. A conduit 46 extends from the carburetor bowl of the carburetor 29 to the conduit 45 to vent the carburetor bowl to eliminate gasoline fumes therefrom.

The air cleaner 28 includes an inner conduit 47 which communicates with the carburetor 29 and is secured thereto by a clamp 48. A sleeve 49 is mounted in the air cleaner 28 surrounding the conduit 47 and has a body of filtering material 50 contained therein. The sleeve 49 has a plurality of apertures 51 in the bottom thereof to permit a flow of air upwardly through the filtering material 50. A chamber 52 is formed on the conduit 47 outwardly thereof to contain a body of oil 53 to provide an oil bath air cleaning action. An outer shell 54 of generally cylindrical form extends downwardly over the chamber 52 and engages an O-ring seal 55 to seal the shell 54 to the chamber 52. A conical cover 56 is secured to the top of the shell 54 by means of a threaded shaft 57 and nut 58. The conduits 27, 44 are joined to the shell 54 to supply the desired air to the air cleaner 28.

The venting air injector 31 includes an adaptor block 59 which is secured between the carburetor 29 and the intake manifold 32 by a pair of bolts 60. The adaptor block 59 has a central vertical bore 61 surrounded by a circular manifold 62. A plurality of downwardly and tangentially sloping jet apertures 63 extend from the manifold 62 into the bore 61. The conduit 30 extends tangentially into the manifold 62 on one side and the conduit 45 extends tangentially into the manifold 62 on the opposite side to supply air in a swirling motion through the manifold 62 which enters the bore 61 through the jet apertures 63 to provide a swirling motion of air therein as well as the venting products and the fuel mixture from the carburetor.

Exhaust gases flow rearwardly from the combined integral heat exchanger and exhaust manifold 22 through a conventional exhaust system 64.

In FIG. 7 a modified one-way air control valve useful with the present invention is illustrated in section. A conduit 65 extends from the intake manifold to a chamber 66 having a diaphragm 67 mounted therein. The chamber 66 has a threaded collar 68 forming part thereof and an actuating rod 69 extends therethrough from the diaphragm 67. A fitting 70 is threaded into the collar 68 and is secured therein by a jam nut 71. The fitting 70 has a valve plate 72 secured to one end thereof to cooperate with a valve 73 secured to the end of the rod 69 opposite the diaphragm 67. A fitting 74 is secured to the valve plate 72 by a plurality of bolts 75 and has an air filter 76 mounted therein. Air normally flows through the fitting 74 and through the valve plate 72 when the valve 73 is in open position. The air then flows into fittings 70 and outwardly through conduits 77, 78 to the point of use.

In the use and operation of the invention air under pressure is supplied to a heat exchanger 22 which is heated by the exhaust manifold and the heated air is fed underpressure to the air cleaner 28 and to the venting air injector 31. With heated air supplied both to the air cleaner 28 and to the venting air injector 31 the air, fuel ratio is changed radically to decrease the fuel use while increasing the engine speed and power. The linkage 37 controls the flow of air to the venting air injector 31 conversant with the foot pedal position in controlling the speed of the motor vehicle. The first throttle valve 35 is actuated by the conventional accelerator foot pedal before the carburetor throttle valve moves off of idling position. First throttle valve 35 serves to control the power and speed during normal cruising speed and in restricted speed areas, then if additional power and speed are needed the foot pedal will open the carburetor throttle valve. The valve 35 is free to operate independently of the carburetor throttle valve.

The engine 21 illustrated in FIGS. 1 through 6 is of a four or six cylinder variety but could be of any number of cylinders desired.

In FIGS. 8 through 13 the anti-pollution structure with a fuel economizing fuel feed and exhaust system indicated generally at 80 is shown applied to a V8 engine indicated generally at 81. The V8 engine 81 is of conventional internal design and includes a block 82 having a water pump 83 mounted on the forward end thereof. The water pump shaft 84 is mounted in a bearing 85 in a housing 86. A fan 87 is mounted on the forward end of the shaft 84 and has a pulley 88 secured thereto. An air blower impeller 89 is secured to the pulley 88 so that rotation of the fan pulley 88 causes a flow of air underpressure in conduits 90, 91 which extends from the blower 92.

The conduit 90 extends to a heat exchanger 93 and the conduit 91 extends to a heat exchanger 94. The heat exchangers 93, 94 are identical for opposite banks of the V8 engine 81. The heat exchanger 94 is an integral part of the exhaust manifold 95 which contains exhaust burners from my U.S. Pat. No. 3,630,031 patented Dec. 28, 1971 and entitled Anti-Pollution System for Internal Combustion Engines. The exhaust manifold 95 has a plurality of ports 96 formed therein so that air flowing into the heat exchanger 94 from the conduits 90, 91 can flow into the exhaust burners mentioned above. A portion of the air heated in the heat exchanger 94 flows outwardly through a conduit 97 to the air cleaner 98 of a carburetor 99. A conduit 100 extends from the heat exchanger 93 to the opposite side of the air cleaner 98.

A conduit 101 extends from the conduit 97 to a venting air injector 102 with the air first passing through a filter 103.

A conduit 104 extends from the conduit 100 through a filter 105 to the venting air injector 102. A conduit 106 extends from the valve cover 107 and are connected through a PCV valve P to the conduit 101 so as to vent oil and fuel fumes from the valve chambers enclosed by the valve covers 107. A conduit 108 extends from the crank case of the engine 81 to a PCV valve 109 to the conduit 101 so as to vent the crank case of fumes. A conduit 110 extends from the carburetor bowl of the carburetor 99 through a PCV valve 111 to eliminate gasoline fumes from the carburetor bowl.

The venting air injector 102 while similar in function to the venting air injector 59 of the engine 21 is modified to provide for the throats of the carburetor 99 and includes tangential venting air injector apertures 112, 113 connected to the conduit 101 and identical apertures on the opposite side connected to the conduit 104.

The air cleaner 98 includes an outer shell 114 of generally cylindrical form connected to the conduits 97, 100 and an inner cage 115 having a dry filter 116 contained therein. The cage 115 with filter 116 can be interchanged as needed. A cover 117 is secured to the air cleaner 98 by means of a threaded shaft 118 and a removeable nut 119.

Exhaust gases from the exhaust manifold 95 flow outwardly through exhaust conduits 120 in a conventional manner.

The use and operation of the invention illustrated in FIGS. 8 through 13 is identical to that of the invention illustrated in FIGS. 1 through 6. The specific valving system illustrated in FIGS. 1 through 6 has not been illustrated in FIGS. 8 through 13 but would be used therewith to provide adequate and complete control of the engine 81.

Having thus described the preferred embodiments of the invention it should be understood that numerous structural modifications and adaptations may be resorted to without departing from the spirit of the invention.

What is claimed is:

1. An anti-pollution internal combustion engine with a fuel economizing fuel feed and exhaust system including an intake manifold, an exhaust manifold, a carburetor, an air cleaner above the carburetor, a body of oil within the air cleaner to provide oil bath air cleaning action, a crank case, a radiator cooling fan, a heat exchanger forming a part of said exhaust manifold, an air blower mounted on said engine and driven from said fan, means for conducting air from said air blower to said heat exchanger, means for conducting heated air from said heat exchanger to the air intake of said carburetor through the air cleaner and oil bath in the cleaner, a venting air injector secured to said intake manifold between said carburetor and said intake manifold, means for conducting heated air from said heat exchanger to said venting air injector, means for venting said crank case into the means for conducting air to said venting air injector, valve covers on said engine, means for conducting fumes from said valve covers to said means for conducting air to said venting air injector, means for venting a bowl of said carburetor into the means for feeding air to said venting air injector, means controlled by the temperature of the air in said heat exchanger for controlling the flow of air to said carburetor, and means controlled by the vacuum in said intake manifold for controlling the flow of air to said venting air injector.

* * * * *